Figure 1:
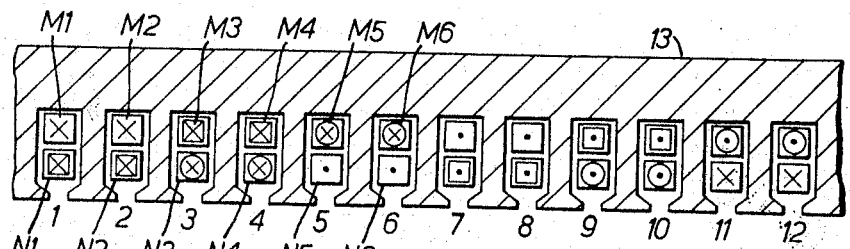
Figure 1:
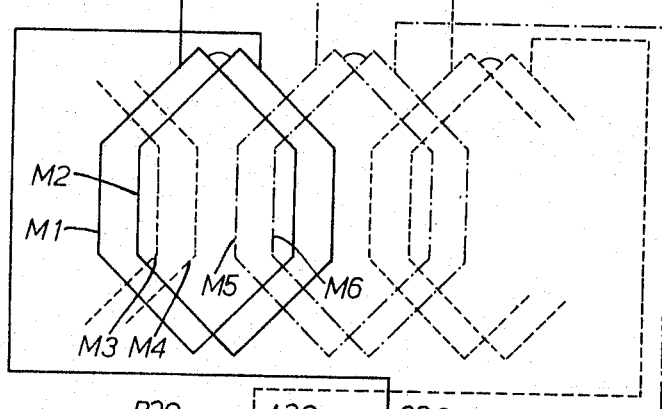

June 13, 1967  A. J. PARSONS  3,325,661
ROTATING ELECTRICAL MACHINERY
Filed Feb. 28, 1964  3 Sheets-Sheet 1

INVENTOR
ARTHUR JAMES PARSONS
BY
Irwin S. Thompson
ATTORNEY

United States Patent Office 3,325,661
Patented June 13, 1967

3,325,661
ROTATING ELECTRICAL MACHINERY
Arthur James Parsons, Stroud, England, assignor to Mawdsley's Limited, Dursley, England, a British company
Filed Feb. 28, 1964, Ser. No. 348,134
13 Claims. (Cl. 310—179)

This invention relates to rotating electrical machinery and provides such a machine which is of particularly advantageous, but not exclusive, application for demonstration and teaching purposes.

According to the invention a rotating electrical machine comprises a slotted and laminated stator with two or more distinctly separate windings utilising the same stator slots, accessible connections being provided to the ends of all the coils of at least one of the windings.

The rotor can be constructed and wound in any of the well-known forms, for example squirrel cage, slip ring, salient pole or cylindrical with excitation winding according to whether the machine is to operate as an induction motor or a synchronous machine. The rotor may also incorporate any combination of the foregoing types of windings, for example as used in a Schrage motor, or it may be slotted and unwound as used for example in an inductor alternator. Preferably the rotor bearing mountings are such that a number of different types of interchangeable rotors can be alternatively fitted to demonstrate and investigate the behaviour of different types of machine.

Preferably the accessible connections are brought out to separate terminals on a terminal panel mounted on or near to the stator frame, and a machine in accordance with the invention has the property that by varying the grouping of said connections the effective coil pitch of the stator windings considered as a whole can be varied without any change in the fixed coil pitches of the individual winding. The advantages of this, particularly for demonstration and teaching purposes, will be readily apparent.

The stator windings may be in the form of single-layer or double-layer windings, and these forms of windings may be mixed. For example, if it is desired to change the effective coil pitch of the stator by increments of two slots two single-layer windings of fixed coil pitches may be provided with all coil connections to one of them brought out to the terminal panel, whereas if it is desired to change the effective coil pitch by increments of one slot a single-layer winding and a double-layer winding may be provided with the connections to the latter brought out to the terminal panel.

Normally the stator windings will be energised in series, for example if two single-layer windings in accordance with the invention are to be used to simulate a conventional double-layer winding. However, in some cases parallel or series-parallel grouping of the separate windings may be advantageous.

Preferably the machine has a main winding of the desired form with coil connections permanently made and the phase connections brought out, one or more separate windings in accordance with the invention having accessible connections to the ends of all the coils thereof.

The invention is conveniently applied to a 2-pole machine, and in the simplest arrangement each separate winding has a fixed coil pitch of 100% related to the main 2-pole winding. However, it will be appreciated that machines with other pole numbers can be obtained incorporating the appropriate number of slots, and the coil pitches of each of the separate windings may be given other desired percentage values, for example 50% or 66.6% with respect to the main winding. The fixed coil pitches of the individual windings may also differ, this being particularly so with a machine designed for teaching and demonstration purposes.

Figure 2:
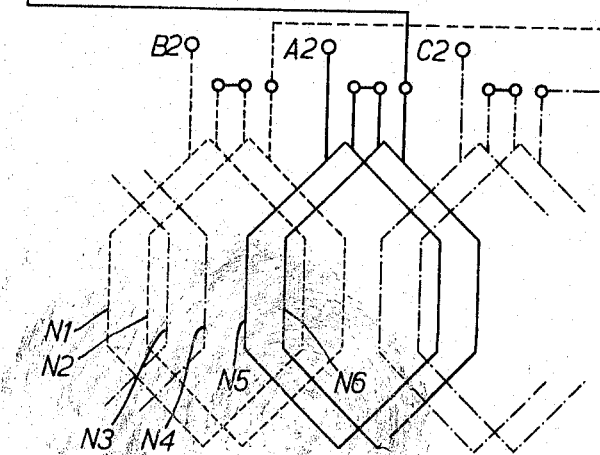
Figure 3:
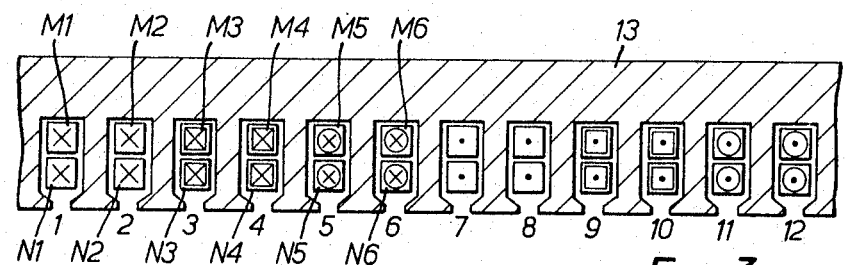
Figure 4:
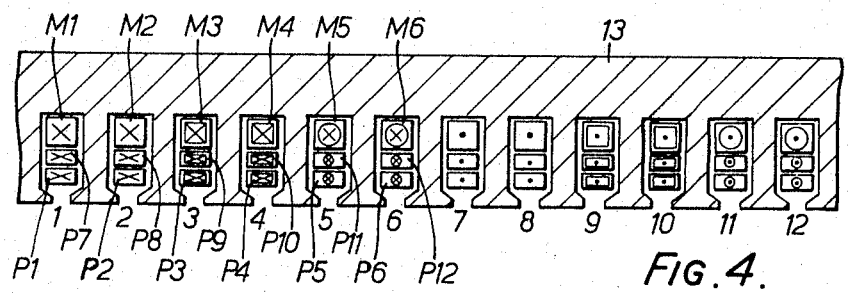
Figure 5:
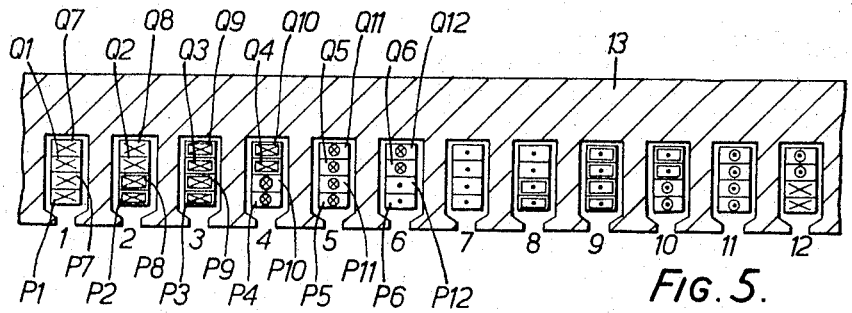
Figure 6:
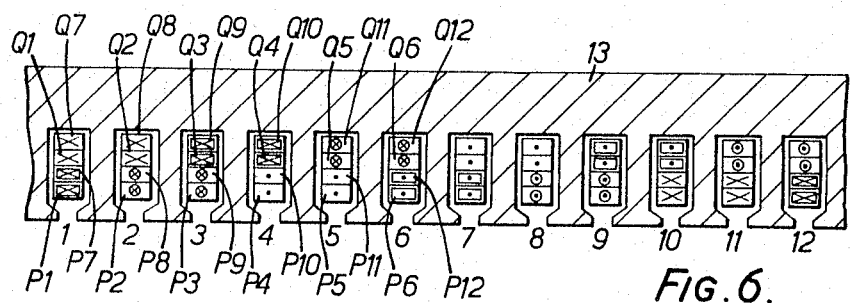
Figure 7:
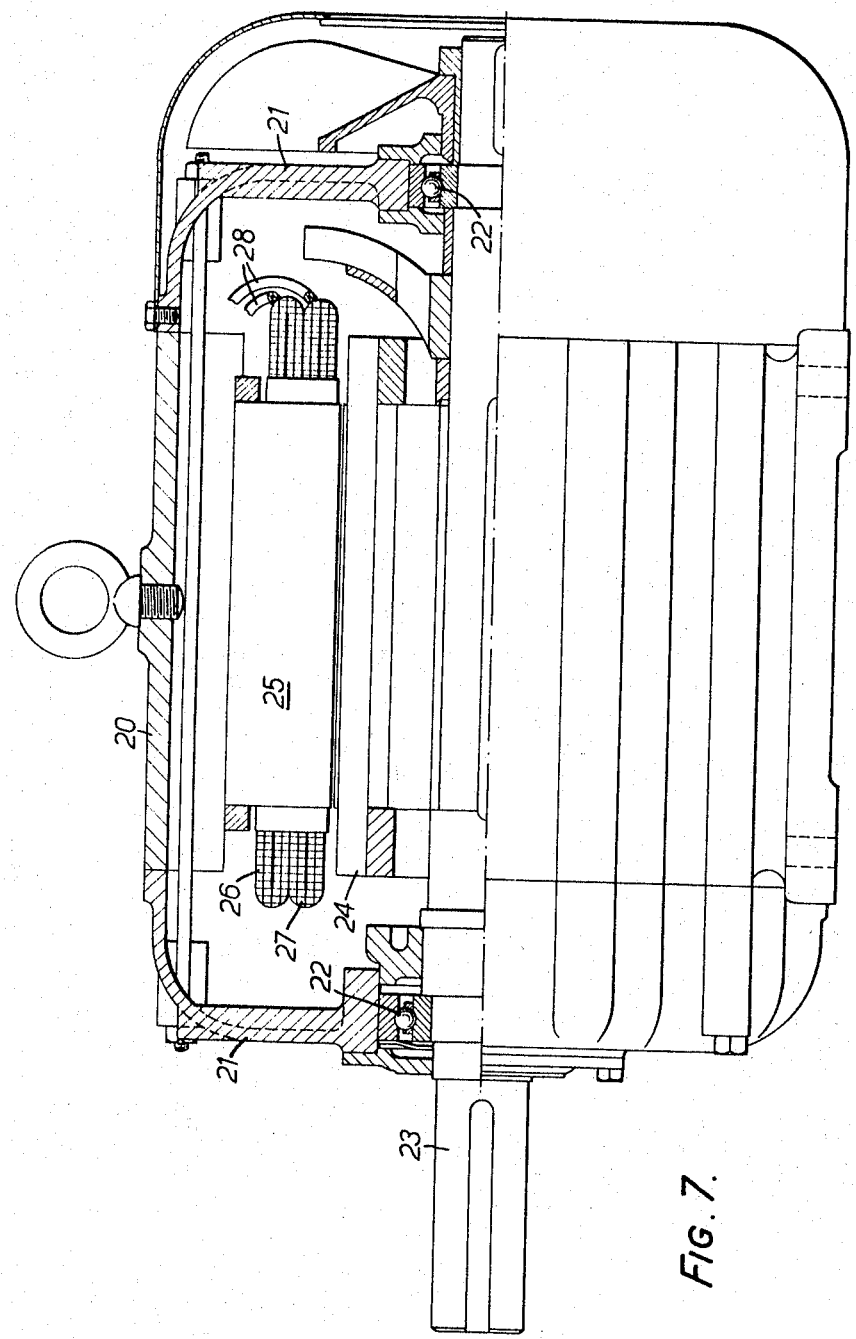

The invention will now be further described with reference to the accompanying drawings which illustrate, by way of example, three arrangements of stator windings in accordance with the invention and some alternative coil groupings thereof. In the drawings:

FIGURE 1 is a diagrammatic developed sectional view showing the stator windings of one embodiment, FIGURE 2 is a winding diagram illustrating the coil grouping shown in FIGURE 1, FIGURE 3 is a view similar to FIGURE 1 showing an alternative grouping of the same embodiment, FIGURE 4 is a similar view of another embodiment, FIGURES 5 and 6 are similar views showing alternative groupings of the third embodiment, and FIGURE 7 is a part-sectional side view showing a suitable form of induction motor to which the invention can be applied.

Each of the illustrated embodiments employs a 12 slot, 2-pole and 3-phase stator. The slots in FIGURES 1 and 3 to 6 are numbered 1 to 12. The winding connections and arrangements will be described with reference to the direction of current flow in the coil sides when considered in relation to one axial direction of the stator, namely into the plane of the paper in FIGURES 1 and 3 to 6, current flowing in that direction being considered as positive flow and in the opposite direction as negative flow. The symbols used in those five figures to illustrate one instantaneous direction of current flow in the windings is shown on the drawings alongside FIGURE 1.

In the embodiment of FIGURES 1 to 3 the stator 13 has two single-layer windings M and N with a fixed coil pitch of 1–7 slots, i.e. each coil spanning six slots. In the drawings the coils of the two windings are respectively designated M1, M2 . . . etc. and N1, N2 . . . etc. For example each winding M or N has one coil M1 or N1 with a side in slot 1 and the other side in slot 7. The main winding M has the coil connections permanently made and arranged for connection to the three phases A, B and C of the power supply so that when instantaneously the coil sides in slots 1 and 2 carry a positive A phase current, with the corresponding negative currents in slots 7 and 8, the coil sides in slots 3 and 4 carry a positive B phase current and those in slots 5 and 6 a positive C phase current.

The separate winding N has connections to the coil ends brought out to a terminal board (not shown) so that the coils N1, N2, . . . etc. can be grouped in a desired manner to vary the effective coil pitch of the stator 13 as a whole. Thus, as shown in FIGURES 1 and 2, the winding N can be arranged so that the coils thereof are connected so that electrically the winding N is displaced two slots as compared with the winding M. As a result with phase A positive current flowing instantaneously as shown in the coil sides of M1 and M2 in slots 1 and 2 of the winding M, in the coil sides of the other winding N in those slots phase B positive current flows. The result of this is to simulate a conventional double-layer single winding of 66⅔% pitch, with the coils thereof spanning 4 slots and for example pitched 1–5.

In the alternative grouping of the connections to the winding N shown in FIGURE 3, the current in the conductors in any one slot of either winding is the same in phase and direction as the current of the other winding in the same slot. The result of this, with the windings M and N in series, is to simulate a double-layer single winding with 100% coil pitch.

The alternative groupings described show how with the embodiment described the apparent coil pitch can be made 1–7 or 1–5, and it will be clear that a further alternative grouping would produce an apparent coil pitch of 1–3 slots. Thus the arrangement of the two single-layer windings M and N in accordance with the invention enables the coil pitch to be changed by increments of two slots.

The embodiment of FIGURE 4 enables the effective coil pitch to be changed in increments of only one slot. A single-layer permanently grouped main winding M is again pitched 1–7 and a separate double-layer regroupable winding P has coils P1, P2 . . . P6 and P8 . . . P12 of both layers which as shown span six slots. Thus the grouping can as shown be such that all the currents in a given stator slot are of the same phase and direction, simulating a double-layer winding of 100% pitch. It will be clear, particularly in view of the preceding description, that regrouping of the connections to the double-layer winding P will enable the effective coil pitch of the stator winding as a whole to be varied by increments of one slot.

In the third embodiment of FIGURES 5 and 6 the main winding M of the earlier embodiments which is not connected to the terminal board for regrouping is replaced by a double-layer winding Q of which the coils Q1, Q2 . . . Q6 and Q7, Q8 . . . Q12 of both layers are pitched 1–7 slots. It will be clear that the coils of the separate and regroupable winding P can again be similarly grouped to provide 100% pitch, and that regrouping again enables the effective overall stator winding pitch to be varied in increments of one slot to simulate conventional double-layer windings of different pitch.

For example, and as shown in FIGURE 5, regrouping to shift the coils of the winding P electrically one slot in one direction will provide an effective coil pitch of 1–6, i.e. 83⅓% pitch. A shift in the same direction of three slots, as shown in FIGURE 6, will provide an effective coil pitch of 1–4, i.e. 50% pitch.

In the foregoing described examples of 2-pole windings, each separate winding is for simplicity illustrated with a fixed coil pitch of 100% related to the main 2-pole winding. It will be appreciated that in other practicable embodiments of the invention the coil pitch of each of the separate windings may be given any other percentage values, for example 50% or 66.6% with respect to the main winding. Also the invention can be applied to machines with other pole numbers by incorporating the appropriate number of stator slots.

The machine of FIGURE 7 is of generally conventional form with a frame 20 carrying end caps 21 which support ball races 22 in which a rotor shaft 23 is mounted. The rotor drum 24 may carry any suitable winding, for example a squirrel-cage winding, and the stator 25 is of laminated form composed of a stack of magnetic stampings. The stator slots, however, house two separate windings 26 and 27 in accordance with the invention.

Winding connections such as 28 terminate at the aforesaid terminal board, the winding 26 being the main winding of fixed grouping. As described the connections 28 render each coil end of the separate winding 27 accessible for the desired regrouping of the coils of that winding.

I claim:

1. A rotating electrical machine comprising a slotted and laminated stator wound with two sets of coils which sets utilise the same stator slots and can be connected to provide two separate and distinct stator windings, all the end terminations of at least one of said sets of coils being brought out to accessible connections whereby the coils of that set can be interconnected as desired to vary the effective coil pitch of the resultant stator windings when considered as a whole.

2. A rotating electrical machine comprising a slotted and laminated stator wound with a fixed pole number and two sets of coils which can be connected to provide two separate and distinct stator windings, all the coils of each set being of the same coil pitch which is different from the coil pitch of the coils of the other set thereof, all the end terminations of at least one of said sets of coils being brought out to accessible connections whereby the coils of that set can be interconnected as desired to vary the effective coil pitch of the resultant stator windings when considered as a whole.

3. A rotating electrical machine comprising a slotted and laminated stator providing two poles and wound with a plurality of sets of coils which utilise the same stator slots and can be connected to provide a corresponding plurality of separate and distinct stator windings, all the coils being of the same coil pitch and the end terminations of at least one of said sets of coils being brought out to accessible connections whereby the coils of that set can be interconnected as desired to vary the effective coil pitch of the resultant stator windings when considered as a whole.

4. A rotating electrical machine according to claim 3, wherein the coils have a coil pitch of 100%.

5. A rotating electrical machine comprising a rotor, and a slotted and laminated stator having a main winding with accessible phase connections and at least one set of coils utilising the same stator slots as said main winding and having end terminations brought out to accessible connections, whereby said coils can be interconnected to provide at least one distinctly separate winding the coils of which are regroupable by varying the interconnections to provide a range of machines having different characteristics.

6. A machine according to claim 5, wherein the main stator winding has a fixed coil pitch of 100% with respect to the pole number used, and the separate set of coils has a different coil pitch with respect to the main winding.

7. A rotating electrical machine according to claim 5, wherein said main winding and said set of coils have a uniform coil pitch.

8. A rotating electrical machine according to claim 7, wherein said coil pitch is 100%.

9. A rotating electrical machine according to claim 5, wherein said main winding and said coil set are both of single layer form.

10. A rotating electrical machine according to claim 5, wherein said main winding and said coil set are both of double layer form.

11. A rotating electrical machine according to claim 5, wherein said main winding is of single layer form and said coil set is of double layer form.

12. A rotating electrical machine comprising a casing, a wound rotor mounted in bearings within said casing, and a stator surrounding the rotor and also disposed within said casing, the stator being slotted and laminated and having windings providing two sets of coils, all the end terminations of at least one of said sets of coils being brought out to accessible connections whereby the coils can be interconnected as desired to provide two distinctly separate windings with the coils of at least said one set regroupable to vary the effective coil pitch, and a terminal board providing said accessible connections.

13. A rotating electrical machine comprising a casing, a wound rotor mounted in bearings within said casing, a stator surrounding the rotor and also disposed within said casing, and a terminal board providing accessible connections, the stator being slotted and laminated and having a main winding and a separate set of coils utilising the same stator slots as the main winding with all the end terminations of said coils brought out individually to said accessible connections whereby the coils can be interconnected as desired to provide two distinctly separate windings with the coils of said one set regroupable.

References Cited

UNITED STATES PATENTS

| | | | |
|---|---|---|---|
| 953,202 | 3/1910 | Hawkins | 310—179 |
| 1,186,146 | 6/1916 | Sutherland et al. | 35—19.1 |
| 1,477,862 | 12/1923 | Barr | 318—224 |
| 1,536,077 | 5/1925 | Creedy | 318—224 |
| 1,675,019 | 6/1928 | Beaver | 35—19.1 |
| 2,515,278 | 7/1950 | Tucker | 35—13 |
| 2,518,506 | 8/1950 | Thompson | 35—19.1 |

OTHER REFERENCES

Abstract: Serial No. 270,788, 4–1943, Latour.

MILTON O. HIRSHFIELD, *Primary Examiner.*

L. L. SMITH, *Assistant Examiner.*